United States Patent [19]

Takada

[11] Patent Number: 4,861,071

[45] Date of Patent: Aug. 29, 1989

[54] ANCHORING DEVICE FOR SEAT BELT

[75] Inventor: Juichiro Takada, Setagaya, Japan

[73] Assignee: Takata Corporation, Tokyo, Japan

[21] Appl. No.: 188,795

[22] PCT Filed: Nov. 16, 1987

[86] PCT No.: PCT/JP87/00885

§ 371 Date: Apr. 8, 1988

§ 102(e) Date: Apr. 8, 1988

[87] PCT Pub. No.: WO88/03883

PCT Pub. Date: Jun. 2, 1988

[30] Foreign Application Priority Data

Nov. 26, 1986 [JP] Japan .................. 61-180565

[51] Int. Cl.$^4$ .............................. B60R 22/20
[52] U.S. Cl. .................... 280/808; 280/801; 297/483
[58] Field of Search ............ 297/483, 468, 483, 486; 280/801, 808

[56] References Cited

U.S. PATENT DOCUMENTS

| 4,500,115 | 2/1985 | Ono ...................... 280/808 |
| 4,552,408 | 11/1985 | Ono ...................... 280/808 |
| 4,556,255 | 12/1985 | Ono ...................... 280/808 |
| 4,577,888 | 3/1986 | Takada .................. 280/808 |
| 4,711,498 | 12/1987 | Adomeit ................ 280/808 |
| 4,720,147 | 1/1988 | Takada .................. 280/808 |

Primary Examiner—Richard A. Bertsch
Attorney, Agent, or Firm—Kanesaka and Takeuchi

[57] ABSTRACT

There is disclosed an anchoring device for use with a seat belt worn in a vehicle. The device is light in weight and compact, since it has a lightweight slide anchor. The device further includes a slip anchor whose height can be adjusted within a range much broader than conventional. The slide anchor (19) is mounted to a rail member (11), which is rigidly fixed to a stationary portion of the body of the vehicle and extends vertically, in such a way that the height of the anchor (19) can be adjusted longitudinally of the rail member. An anchor bolt (25) protruding inwardly of the passenger's compartment is rigidly fixed to the anchor (19). The seat belt (80) has its central portion supported by a slip anchor (23) that is rotatably held to the bolt (25). A retaining pin (27) is removably inserted in a hole (26) extending through the bolt (25). Holes (12) are formed longitudinally of the rail member (11) opposite to the front end of the pin (27). A spring (30) is mounted to bias the pin (27) in such a direction that its front end is fitted in one of the holes (12). An operation mechanism is formed on the head of the pin (27) to permit the pin (27) to be withdrawn from the hole (12).

9 Claims, 4 Drawing Sheets

ANCHORING DEVICE FOR SEAT BELT

TECHNICAL FIELD

The present invention relates to an anchoring device for supporting the upper end of the shoulder portion of a seat belt mounted in a vehicle, such as an automobile, in such a way that the height of the shoulder portion can be adjusted and, more particularly, to an anchoring device that is used with a seat belt and permits the point at which the belt is supported is moved over a wide range and facilitates adjusting the height without the need to increase the whole length of a rail member.

BACKGROUND ART

Some of seat belts mounted in automobiles use a connector belt which holds both one shoulder and the loins of a passenger. Many of these seat belts have a slip anchor passing through the central portion of the seat belt to hold the central portion and correctly fasten one shoulder of a passenger in conformity with the sitting height and the physical make of the passenger. The anchor is mounted to a stationary portion of the automobile body, such as a center pillar, so as to be vertically adjustable.

In the conventional seat belt-anchoring device of this kind, a slide anchor is movably mounted to a rail member extending vertically. The rail member is rigidly fixed to a stationary portion of the automobile body, such as a center pillar. An anchor bolt is firmly attached to the underside of the slide anchor. The slip anchor which passes through the seat belt and guides it is rotatably held by the anchor bolt. A retaining pin that is always urged to protrude by a leaf spring is mounted over the slide anchor so as to be capable of protruding rearward from the back surface of the slide anchor. A knob that can be operated by a person is formed integrally with the pin. Some holes are formed in the rail member longitudinally, and the front end of the pin can be inserted into any one of these holes so as to be withdrawable. If necessary, the knob is pulled to withdraw the pin integral with it from one hole in the rail member. Then, the slide anchor is free to move vertically. In this state, its height can be easily adjusted.

In the conventional seat belt-anchoring device constructed as described above, it is necessary to allow the slide anchor to move a long distance, for preventing the knob on the pin from interfering with the slip anchor. This narrows the range in which the height can be adjusted. Further, the weight of the assembly increases.

If the whole length of the rail member is increased, then the range in which the height of the slide anchor can be adjusted is enlarged. However, the upper and lower points at which the rail member is fixed are spaced more widely and so the central portion bends easily. Elongating the rail member increases the weight and the space needed for installation accordingly.

Also in the prior art seat belt-anchoring device, the retaining pin is required to be pulled against the action of a biasing spring to withdraw the pin from one hole in the rail member. Then, the slide anchor is moved vertically. Therefore, the device is difficult to operate with one hand.

DISCLOSURE OF THE INVENTION

The present invention is intended to provide an anchoring device that is for use with a seat belt and enlarges the range in which a slide anchor can move, without increasing the whole length of a rail member.

It is another object of the invention to provide a seat belt-anchoring device which permits the height of the shoulder portion of a seat belt to be easily and quickly adjusted.

In a seat belt-anchoring device built in accordance with the invention, a rail member extending vertically is rigidly fixed to a stationary portion of the body of an automobile, such as a center pillar, and a slide anchor is mounted to the rail member in such a way that the height of the slide anchor can be adjusted longitudinally of the rail member. An anchor bolt that protrudes inwardly of the passenger's compartment is mounted to the slide anchor. A slip anchor extends through the central portion of the seat belt to hold it. The slip anchor is rotatably held to the anchor bolt. A hole is formed in the anchor bolt. A retaining pin is inserted in this hole so as to be withdrawable. A plurality of holes are formed in the rail member longitudinally. The front end of the retaining pin is received in one of these holes in the rail member. A spring is held to the anchor bolt to bias the retaining pin in such a way that its front end is fitted in one of the holes in the rail member. An operation portion is formed on the retaining pin in an opposite relation to the front end to withdraw the front end from the hole. This operation portion comprises a movable member and a connecting member that connects the movable member with the retaining pin. The movable member is capable of moving in a direction perpendicular to the direction in which the retaining pin enters one of the holes. When the movable member is pushed toward the retaining pin, the connecting member moves the pin out of the hole.

In the seat belt-anchoring device constructed as described above, the operation portion on the retaining pin is mounted in the center of the anchor bolt coaxially with the bolt. The front end of the pin can be withdrawn from the hole in the rail member simply by pushing the movable member of the operation portion. The height of the slide anchor can be easily adjusted. The length of the slide anchor in the direction in which it can move is much shorter than that of the prior art slide anchor. Therefore, the slide anchor moves for a long distance relative to the rail member. This enlarges the range in which the height of the slide anchor can be adjusted. Also, the upper end of the seat belt can be connected to a stationary portion of the automobile body at an appropriate height in conformity with the sitting height and the physical make of the passenger.

BEST MODE FOR CARRYING OUT THE INVENTION

Figure 1:
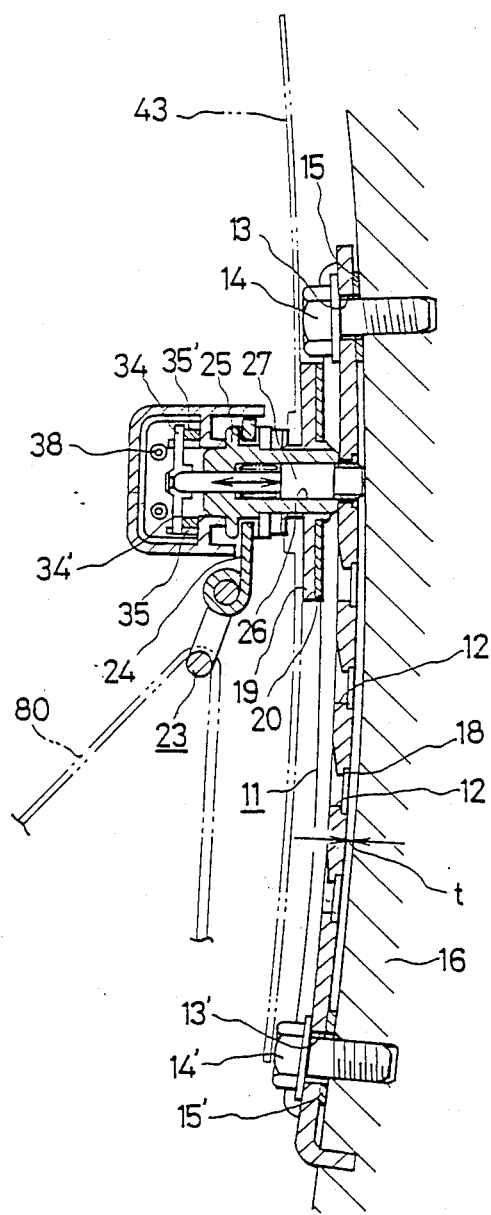
FIG. 1 is a side elevation in cross section of a seat belt-anchoring device according to the invention.
Figure 2:
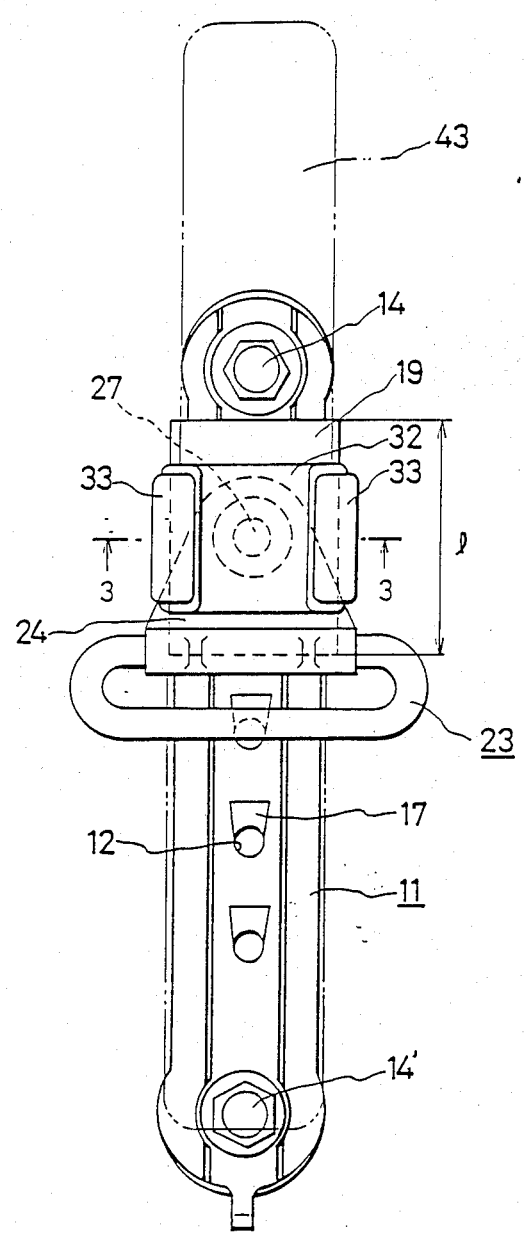
FIG. 2 is a front elevation of the device shown in FIG. 1.

FIG. 1 is a side elevation in cross section of a seat belt-anchoring device according to the invention. FIG. 2 is a front elevation of the device shown in FIG. 1.

Figure 3:
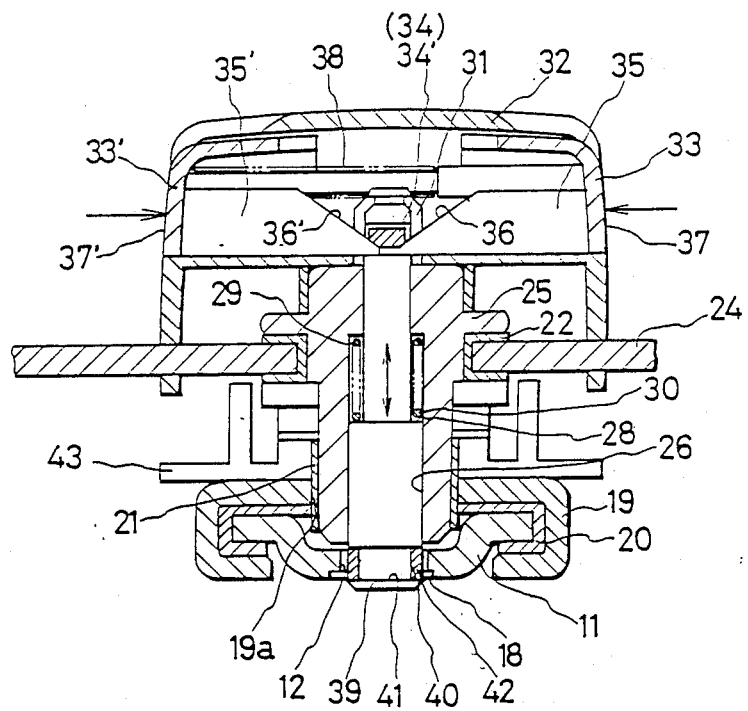
FIG. 3 is a cross-sectional view taken on line 3—3 of FIG. 2.

FIG. 3 is a cross-sectional view taken on line 3—3 of FIG. 2.

Referring to FIGS. 1-3, a rail member 11 is fabricated from a belt-like metal plate extending vertically by press working. This rail member 11 takes a shape as shown in horizontal cross section, and has jaws at its both fringes. A certain bending resistance is imparted to the member. A plurality of holes 12 extend through the rail member 11, and these holes are arranged longitudinally. The rail member 11 is also provided with holes 13 and 13' at its upper and lower ends, respectively. Bolts 14 and 14' pass through the holes 13 and 13', respectively, and are screwed to a center pillar 16 via washers 15 and 15', respectively. The pillar 16 constitutes one stationary portion of the body of an automobile. Thus, the rail member is firmly fixed to the stationary portion 16 of the body such that a given gap t is left between the rear surface of the rail member and the mounted surface of the stationary portion 16.

An inclined guide surface 17 is formed on the front side of the opening of each hole 12 in the rail member 11 to facilitate insertion and withdrawal of a retaining pin 27 (described later). The rear side of the opening of each hole 12 is subjected to a press working, so that the fringe 18 of the hole 12 is slightly depressed from the rear surface of the rail member 11. The actual depth of each hole 12 is constant, irrespective of the thickness of the rail member 11. The corner of the fringe 18 of the opening forms a substantially right-angled edge.

A slide anchor 19 is made of a metal plate and slidably connected to the jaws at both ends of the rail member 11 via sheets 20 made of a synthetic resin. These sheets 20 are used to reduce friction. The anchor 19 is mounted so as to be movable longitudinally of the rail member 11. The anchor 19 is centrally formed with a hole 19a on its front side. A nut 21 is rigidly attached within the hole 19a. An anchor bolt 25 is screwed to the nut 21. The base portion 24 of a slip anchor 23 is rotatably held by the anchor bolt 25 via a soundproof bush 22. The anchor 23 serves to guide the upper end of the shoulder portion of a seat belt 80 so as to be slidable.

The slide anchor 19 has a length l in the direction in which it can move. This length is set shorter than the length of the conventional anchoring device. The anchor 19 can move for a longer distance relative to the rail member 11 than the conventional anchoring device.

The anchor bolt 25 is centrally provided with a stepped hole 26. A cylindrical pin 27 is inserted in the hole 26 so as to be slidable in a direction perpendicular to the direction of movement of the slide anchor 19. The hole 26 has a step 29. The pin 27 has a step 28 at its center. A coiled spring 30 is compressed between the steps 28 and 29 to always bias the pin 27 in such a direction that the front end of the pin 27 is fitted in one of the holes 12 formed in the rail member 11.

A cylindrical pin cap 31 is rigidly mounted on the outer periphery of the head of the retaining pin 27. The cap 31 is surrounded by an adjuster cover 32 and a pair of operation members 33 and 33'. The cover 32 is so mounted to the base portion 24 of the slip anchor 23 that it can rotate with the base portion about the anchor bolt 25. The operation members 33 and 33' are juxtaposed and housed in the cover 32 in such a manner that they can be slided when pushed. Protrusions 34 and 34' extend from side surfaces of the pin cap 31 perpendicularly to the axis of the pin 27. Cam plates 35 and 35' extend opposite to each other and inwardly from the inner surfaces of the operation members 33 and 33', respectively. The cam plates 35 and 35' have inclined cam surfaces 36 and 36', respectively, and their front ends are superimposed. The protrusions 34 and 34' engage with the cam surfaces 36 and 36', respectively. A spring 38 is compressed between outer surfaces 37 and 37' of the operation members 33 and 33', respectively. When these outer surfaces 37 and 37' are pushed to slide toward each other against the action of the spring 38, the protrusions 34 and 34' on the head of the pin 27 shift axially along the cam surfaces 36 and 36', respectively. Then, the front end of the pin 27 comes out of the hole 12.

The pin 27 has a peripheral groove 40 at the location where the pin 27 is fitted in the hole 12 in the rail member 11. The groove 40 has a width greater than at least the depth of the hole 12 in the member 11 except for a given length of an engaging portion 39. An engaging step 41 is formed at the end of the groove 40 opposite to the fringe 18 of the opening in the hole 12. The step 41 can engage with the fringe 18.

A resinous cylinder 42 is mounted in the groove 40 formed in the pin 27. The cylinder 42 possesses such rigidity that it does not deform when subjected to stresses produced during normal use of the belt, and that it is deformed or destroyed after pressed against the inner surface of the hole 12 if an impulsive load exceeding a given value acts on the belt. If the cylinder is deformed or destroyed in this way, then the engaging step 41 of the pin 27 is allowed to engage the fringe 18 of the opening in the hole 12. The cylinder 42 is provided with a slit extending along the axis of the cylinder. The cylinder 42 is assembled: (1) by fitting it into the groove 40 in the pin 27 by utilizing the resilience of the cylinder itself; (2) by inserting the pin 27 in a casting mold, introducing resinous material directly into the groove 40, and molding the cylinder; (3) or by shaping the cylinder 42 into a form conforming to the groove 40 and bonding the cylinder to the pin 27 with adhesive.

The cylinder can be made of any resinous material, as long as it can satisfy the aforementioned mechanical characteristics, but usually it is preferably made of polyacetal resin, polyester resin, or other similar material. The cylinder 42 is designed so that when the pin 27 is inserted into or withdrawn from the hole 12, the outer surface of the cylinder 42 does not impede such an operation.

A slide garnish 43 is fixed to the front side of the slide anchor 19 to conceal the rail member 11 and the slide anchor 19.

The novel seat belt-anchoring device operates in the manner described below. When the seat belt is worn, the position of the slide anchor 19 is shifted upward or downward so that the height of the slip anchor 23 may match the physical make of the passenger. For this purpose, the knob is operated to push the outer surfaces 37 and 37' of the operation members 33 and 33' from both sides. The protrusions 34 and 34' on the pin cap 31 ride on the inclined cam surfaces 36 and 36', respectively, and the retaining pin 27 is withdrawn from the hole 12 in the rail member 11. Then, the slide anchor 19 is permitted to move along the rail member 11. The passenger moves the anchor 19 into a desired position and releases the operation members 33 and 33'. The pin 2 is automatically fitted into the hole 12 by the biasing force of the spring 30. Subsequently, the slip anchor 23 is rotatably held at a desired height to locate the slide anchor 19 in position.

The slide anchor 19 has the length l in the direction in which it can move, and this length is shorter than conventional. The anchor 19 can for a longer distance relative to the rail member 11. Therefore, the range in which the height can be adjusted is substantially enlarged. Consequently, the belt can be better matched to the passenger's physical make.

The resinous cylinder 42 mounted on the pin 27 is not deformed at all by stresses produced during normal use of the seat belt 80. In this state, the cylinder 42 prevents the engaging step 41 of the pin 27 from engaging the fringe 18 of the opening in the hole 12. This mitigates the collision between the outer surface of the pin 27 and the inner surface of the hole 12. Hence, generation of noise which would otherwise be caused by vibration during running of the vehicle is prevented.

When the slide anchor 19 is fixed, if an impulsive load exceeding a given value, generally 200 Kg to 3 tons, is applied to the seat belt 80 as by collision of the vehicle, then a load is applied to the pin 27 in a direction perpendicular to the axis via the slip anchor 23 and the slide anchor 19. The resinous cylinder 42 is pressed against the inner surface of the hole 12, so that the cylinder is deformed. The engaging step 41 of the pin 27 comes into engagement with the fringe 18 of the opening in the hole 12, preventing the pin 27 from coming out of the hole 12. Also, they are connected together with a greatly increased strength. The slide anchor 19 is prevented from sliding downward. As a result, the passenger is maintained in a correct restrained state by the seat belt 80.

Figure 4:
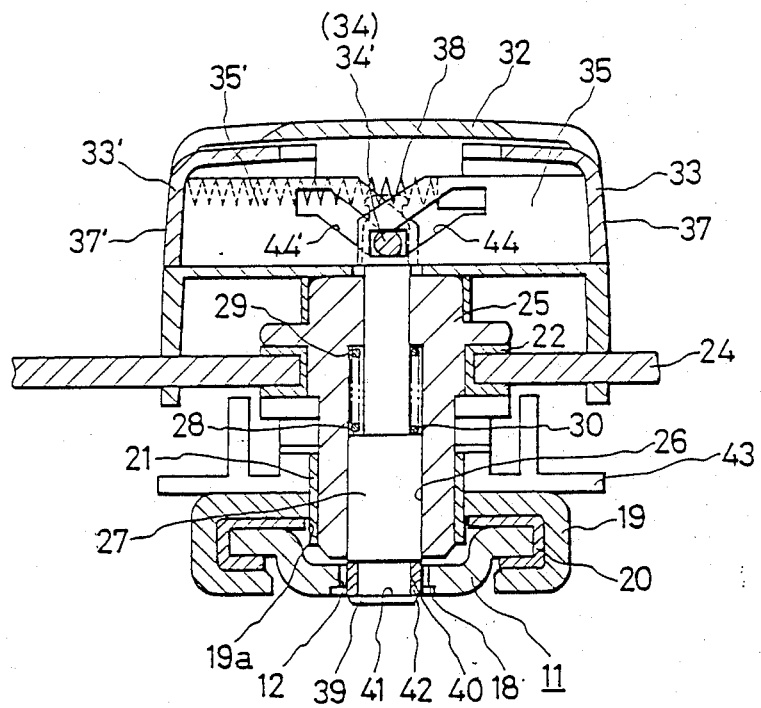
FIG. 4 is a schematic perspective view of an operation portion on a retaining pin that can be used in the device shown in FIG. 1.

FIG. 4 shows another seat belt-anchoring device according to the invention. It is to be noted that like components are indicated by like reference numerals throughout all the figures. The cam plates 35 and 35' on the operation members 33 and 33' are provided with inclined slots 44 and 44', respectively. The protrusions 34 and 34' of the pin cap 31 mounted on the head of the retaining pin 27 are fitted in the slots 44 and 44', respectively, to constitute a positive cam mechanism.

In this state, the retaining pin 27 moves and comes out of the hole only when the operation members 33 and 33' are pushed. Therefore, if a large impulsive force is applied to one side of the vehicle, it is unlikely that the pin 27 comes out of the hole due to inertia. Further, the biasing force of the spring 30 which urges the pin 27 to fit in the hole 12 can be set to a smaller value. Hence, a small force is needed to operate the operation members, and the height can be adjusted with greater ease.

The operation mechanism on the head of the retaining pin 27 can be formed differently from the foregoing. For instance, an adequate force converter mechanism may be used which converts the horizontal manual forces applied to the operation members 33 and 33' into a force for inserting or withdrawing the pin 27.

In the above examples, the slip anchor is employed t support the seat belt. This anchor passes through the seat belt 80 and then its direction is changed. The invention is also applicable to an anchoring device which connects a buckle to the automobile body at a location above one shoulder of the passenger in such a way that the position of the buckle can be adjusted vertically. In this case, the buckle is mounted instead of the slip anchor. A tongue seamed to the front end of the seat belt is detachably connected to the buckle.

Industrial Applicability

As described above, if the novel anchoring device for use with a seat belt uses the same length of rail member as the prior art rail member, the slide anchor is able to move a longer distance relative to the rail member than heretofore. This enables the range in which the height of the slip anchor is adjusted to be enlarged. Also, the weight of the slide anchor can be reduced. Consequently, the device can be made lighter and more compact.

Furthermore, in accordance with the invention, the retaining pin can be inserted into and withdrawn from the hole only with one hand simply by operating the knob to push the outer surfaces of the operation members. Also, it is unlikely that the slip anchor-interferes with the operation portions on the pin, because the operation portions are disposed at the protruding end of the anchor bolt within the passenger's compartment, the anchor bolt being rigidly fixed to the slide anchor. Additionally, the height of the shoulder portion can be easily and quickly adjusted.

I claim:

1. An anchoring device for a seat belt on a vehicle, comprising:
    an elongated rail member fixed to the vehicle to extend vertically, said rail member having a plurality of holes longitudinally spaced apart from each other,
    a slide anchor slidably engaging the rail member to move in the longitudinal direction of the rail member,
    an anchor bolt fixed in the center of the slide anchor, said anchor bolt extending in the direction away from the rail member and having a through hole therein,
    a slip anchor rotatably attached around the anchor bolt, said slip anchor adapted to hold a center portion of the seat belt,
    a retaining pin situated in the through hole of the anchor bolt to be slidable along an axis of the through hole, said retaining pin being urged in the direction toward the hole of the rail member to engage therewith, and
    operation means having connecting means attached to the retaining pin, and a movable member fixed relative to the anchor bolt to slide perpendicular thereto, said movable member engaging the connecting means so that when the movable member is pushed toward the retaining pin, the connecting means is raised to disengage the retaining pin from the hole of the rail member to adjust the position of the slide anchor on the rail member.

2. An anchoring device according to claim 1, wherein said retaining pin includes an annular groove at a lower portion thereof, the width of the groove being greater than the depth of the hole of the rail member so that the retaining pin can securely engage the hole of the rail member.

3. An anchoring device according to claim 2, further comprising a cylinder mounted in the annular groove of the retaining pin, said cylinder having a property such that when an impulsive load above a predetermined amount is applied to the cylinder by an edge of the hole of the rail member, the cylinder at least deforms, whereby the retaining pin can securely engage the hole in the rail member in emergency situation.

4. An anchoring device according to claim 3, further comprising a spring attached to the retaining pin to urge the retaining pin toward the rail member relative to the anchor bolt.

5. An anchoring device according to claim 4, wherein said rail member further includes guide surfaces at respective edge portions of the holes to facilitate insertion and withdrawal of the retaining pin.

6. An anchoring device according to claim 1, wherein said movable member of the operation means includes cam plates having cam surfaces extending at an angle to the direction in which the retaining pin disengages from the hole, and the connecting means of the operation means includes a cap attached to the retaining pin, said cap having protrusions engaging the cam surfaces of the cam plates.

7. An anchoring device according to claim 6, wherein said cam plates are disposed on opposite sides of the retaining pin, a user being able to push the opposite ends of the cam plates by fingers.

8. An anchoring device according to claim 7, further comprising a spring biasing the cam plates to move away from each other.

9. An anchoring device according to claim 8, wherein said movable member further includes operation members fixed to the cam plates opposite to the retaining pin, said operation members being pushed when the anchoring device is moved.

* * * * *